United States Patent [19]

Nakajima

[11] Patent Number: 5,788,219
[45] Date of Patent: Aug. 4, 1998

[54] THROTTLE VALVE FOR AN AIR TOOL

[76] Inventor: Saburo Nakajima, 1191-9, Nakanodai, Noda, Japan

[21] Appl. No.: 562,256

[22] Filed: Nov. 22, 1995

[51] Int. Cl.$^6$ ..................................... F16K 31/00
[52] U.S. Cl. ............... 251/339; 251/228; 251/239; 251/263
[58] Field of Search ................... 251/339, 263, 251/238, 239, 228

[56] References Cited

U.S. PATENT DOCUMENTS

| | | | |
|---|---|---|---|
| 2,362,608 | 11/1944 | Allen | 251/239 |
| 2,553,991 | 5/1951 | Wagner et al. | 251/238 |
| 5,205,540 | 4/1993 | Clapp | 251/339 |

FOREIGN PATENT DOCUMENTS 647466  12/1950  United Kingdom ............... 251/238

*Primary Examiner*—A. Michael Chambers
*Attorney, Agent, or Firm*—Jordan and Hamburg

[57] ABSTRACT

A throttle valve is disposed in a handle of an air tool. The throttle valve includes a throttle trigger provided on the handle of the air tool, and a throttle pin which is fixed to the throttle trigger and adapted to axially move when the throttle trigger is operated. A valve stem having a head portion is coupled with the throttle pin. A valve bush is press-fit into a shoulder portion provided inside the handle on which the head portion of the valve stem rests. A spring is provided to urge the head portion of the valve stem to contact the valve bush and to allow the valve stem to tilt when the throttle pin axially moves. This structure makes it possible to provide airtightness between the shoulder portion and the head portion of the valve stem by a simplified machining. In addition, the airtightness can be maintained for a longer period of time compared to the case of using a washer made of Teflon.

10 Claims, 3 Drawing Sheets

THROTTLE VALVE FOR AN AIR TOOL

BACKGROUND OF THE INVENTION

The present invention relates to a throttle valve for an air tool, and more particularly to a throttle valve disposed in a handle of an air tool such as an air impact wrench.

A conventional air impact wrench (an air tool) which includes a throttle valve in its handle will be described with reference to FIGS. 1 and 2. FIG. 1 is an exploded view (a perspective view) showing a handle B of an air impact wrench, and FIG. 2 is an enlarged sectional view of the handle B shown in FIG. 1.

In an air tool of this kind, an air hose is connected to a hose adaptor 9, and the rotational speed of an unillustrated rotor in a motor housing A is controlled by changing the amount of depression of a throttle trigger 1.

When the throttle trigger 1 is pressed, a throttle pin 2 is moved from right to left as shown in FIG. 2. As a result, a valve stem 4 coupled with the throttle pin 2 is tilted. Initially, a head portion 4a of the valve stem 4 closely contacts a shoulder portion 5 provided inside the handle, due to pressing force of a throttle spring 3. However, when the valve stem 4 is tilted, the head portion 4a is inclined relative to the shoulder portion 5. As a result, a gap is formed between the shoulder portion 5 and the head portion 4a, so that pressurized air flows into the motor housing A.

The flow rate of the pressurized air is proportional to the angle β of inclination of the head portion 4a with respect to the shoulder portion 5, and the angle β is proportional to the amount of depression of the throttle trigger 1. Therefore, the flow rate of the pressurized air can be finely adjusted by changing the amount of depression of the throttle trigger 1. A throttle valve having the above-described structure is called a "feather touch trigger type throttle valve".

In the above-described throttle valve, it is necessary to smoothly finish a surface of the shoulder portion 5 (hereinafter referred to as a "shoulder surface 5a") against which the head portion 4a of the valve stem 4 rests, so as to maintain airtightness between the head portion 4a and the shoulder portion 5.

Conventionally, a lapping tool is inserted into a throttle spring hole 11 of the handle B from the inlet of the hole 11, to which the hose adapter 9 is attached, so as to smoothly finish the shoulder surface 5a.

However, this structure requires time-consuming and difficult lapping to finish the shoulder surface 5a, resulting in increased costs.

To overcome this problem, a mechanism shown in FIGS. 1 and 2 has been proposed, in which a washer 12 made of Teflon is interposed between the shoulder surface 5a and the head portion 4a. Since the washer 12 has been finished to have a smooth surface, it becomes unnecessary to lap the shoulder surface 5a.

However, when the throttle valve is used for a long time, the washer 12 deforms due to friction against the head portion 4a of the valve stem 4, and pressure of the pressurized air introduced from the hose adaptor 9. As a result, sufficient airtightness cannot be obtained when the throttle trigger 1 is not pressed.

SUMMARY OF THE INVENTION

In view of the foregoing problems, an object of the present invention is to provide a throttle valve for an air tool in which airtightness between a shoulder surface provided inside a handle of the air tool and a head portion of a valve stem is provided by a simple machining.

Anther object of the present invention is to provide a throttle valve which can maintain the airtightness for a longer period of time compared to the case where a conventional washer made of Teflon is used.

A throttle valve disposed in a handle of an air tool according to the present invention comprises a throttle trigger provided on a handle of an air tool, and a throttle pin which is fixed to the throttle trigger and adapted to axially move when the throttle trigger is operated. A valve stem with a head portion is coupled with the throttle pin. A valve bush is press-fit into a shoulder portion provided inside the handle on which the head portion of the valve stem rests. A spring is disposed to urge the head portion of the valve stem to contact the valve bush and to allow the valve stem to tilt when the throttle pin axially moves.

Preferably, the valve bush is provided with a groove, and an O-ring is fit into the groove.

Preferably, an inner cylindrical surface of the valve bush is provided with a tapered surface having a diameter which increases toward an air exit.

DETAILED DESCRIPTION OF THE INVENTION

Figure 1:
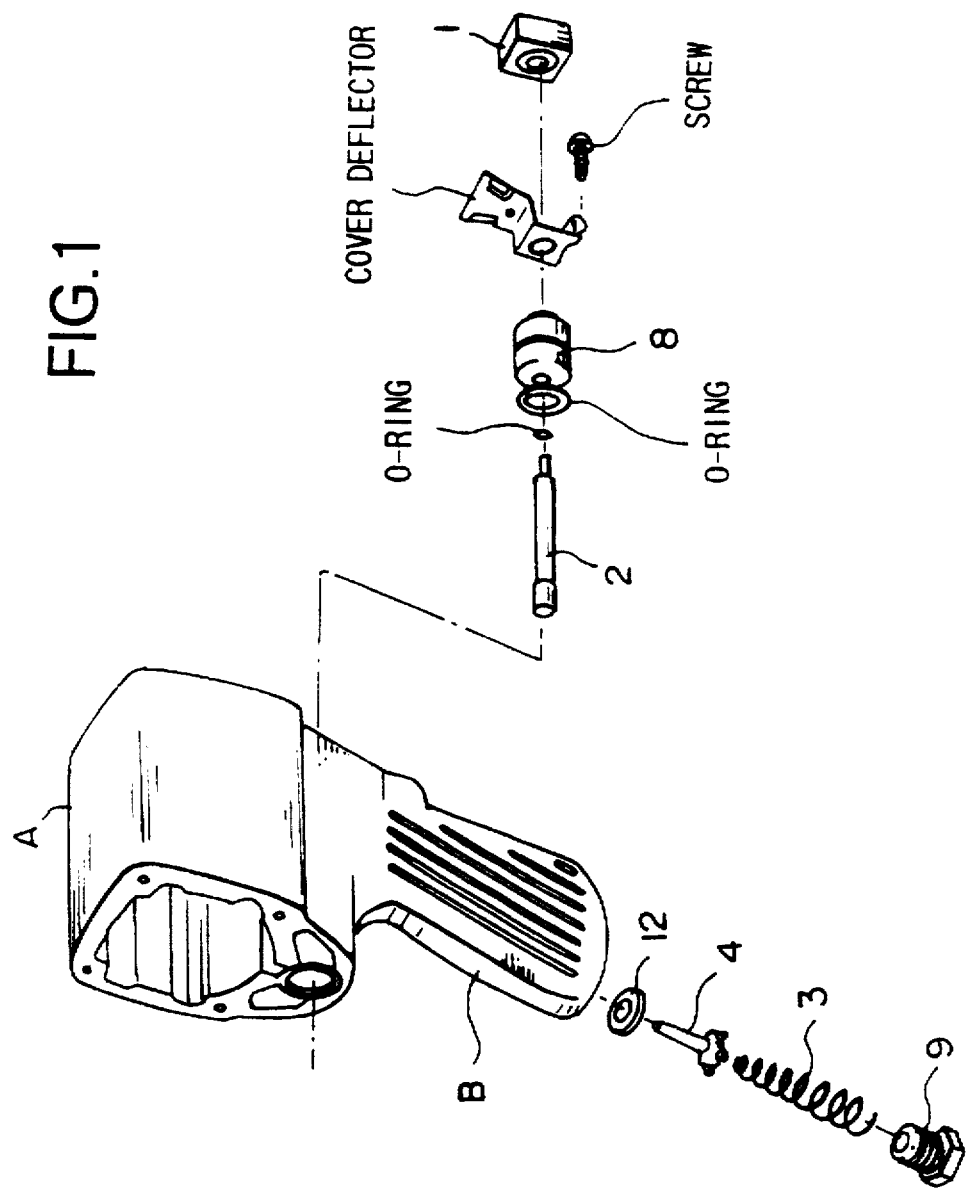
FIG. 1 is an exploded perspective view of a handle of an air impact wrench (an air tool)
Figure 2:
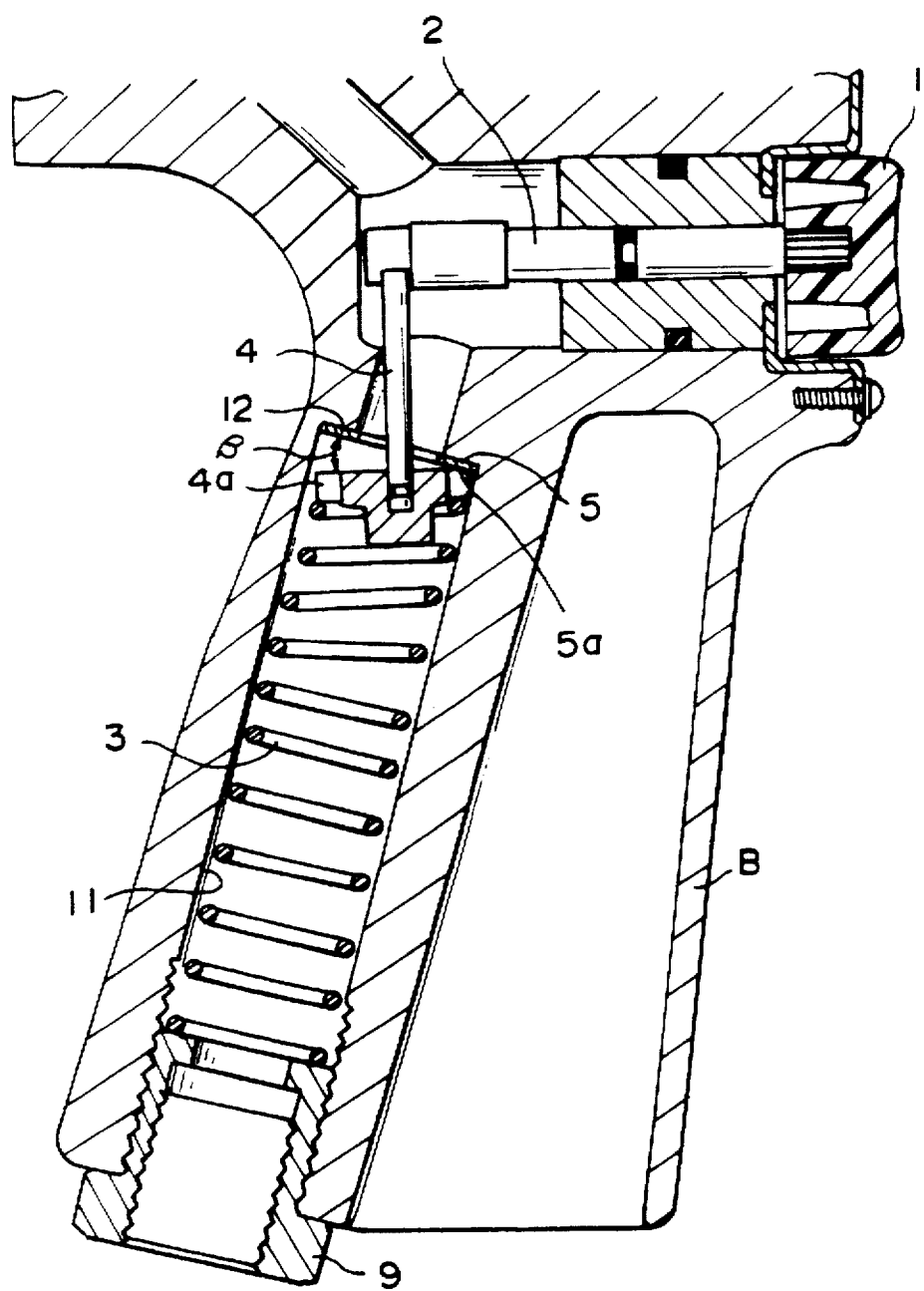
FIG. 2 is a sectional view of a conventional throttle valve.
Figure 3:
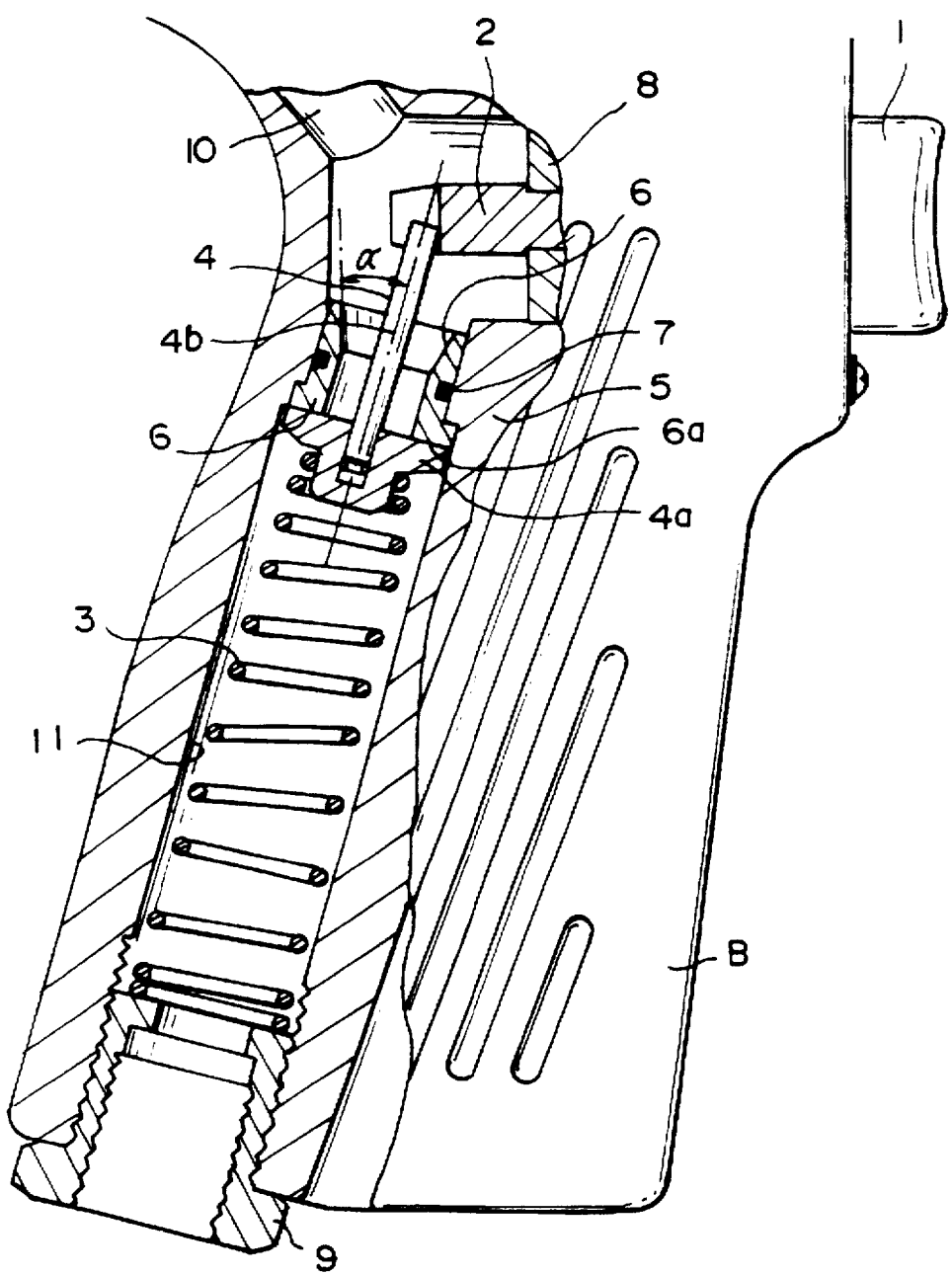
FIG. 3 is a sectional view of a throttle valve according to the present invention.

An embodiment of the present invention will now be described with reference to FIG. 3 and FIG. 1. FIG. 3 is an enlarged sectional view of a throttle valve according to the present invention.

The handle of an air tool is provided with a throttle trigger 1 to which a throttle pin 2 is connected. The throttle pin 2 is inserted into a throttle bush 8 such that the throttle pin 2 is slidable from right to left in FIG. 3. The throttle pin 2 axially moves when the throttle trigger 1 is pressed and released.

A valve stem 4 is comprised of a stem portion 4b coupled with the throttle pin 2, and a head portion 4a. The head portion 4a is in contact with a lower end surface of a valve bush 6 which is press-fit into a shoulder portion 5 provided inside the handle. When the throttle trigger 1 is not pressed, the head portion 4a closely contacts a shoulder surface 6a of the valve bush 6 because the head portion 4a is urged upwardly by a throttle spring 3. This provides airtightness between the head portion 4a and the shoulder surface 6a of the valve bush 6. When the throttle trigger 1 is pressed, the throttle pin 2 is moved to the left in FIG. 3. As a result, the valve stem 4 is tilted leftwardly, so that the head portion 4a of the valve stem 4 is inclined relative to the shoulder surface 6a of the valve bush 6. Since the head portion 4a of the valve stem 4 has a gear-like shape as shown in FIG. 1, a gap is formed between the valve bush 6 and the head portion 4a when the head portion 4a of the valve stem 4 is inclined, so that pressurized air from a hose adaptor 9 flows into the motor housing through the gap.

The pressurized air passing through the valve bush 6 flows toward an unillustrated rotor through an air exit 10. The throttle spring 3, which presses the head portion 4a toward the valve bush 6, is received in a throttle spring hole 11 formed in the handle. One end of the throttle spring 3 contacts the head portion 4a of the valve stem 4 to urge the head portion 4a upwardly, as described above. The other end of the throttle spring 3 contacts the upper end surface of the hose adaptor 9.

A groove is formed in the outer cylindrical surface of the valve bush 6. It is preferred that the valve bush 6 be press-fit into the shoulder portion 5 provided inside the handle after fitting an O-ring 7 into the groove. The O-ring 7 increases the airtightness at the shoulder portion 5.

Preferably, an inner cylindrical surface of the valve bush 6 is provided with a tapered surface 6b having a diameter which increases toward the air exit 10. The provision of the tapered surface 6b widens the tilting range α of the valve stem 4, so that the flow rate of air can be adjusted by the throttle trigger 1 over a widened range.

In the present invention, since a valve bush is press-fit into the shoulder portion provided inside the handle, the end surface of the valve bush, which surface contacts the head portion of the valve stem, can be finished to obtain an accurate and smooth surface before the valve bush is press-fit into the shoulder portion. This eliminates the necessity of lapping the shoulder portion, thereby decreasing costs.

In addition, since the valve bush is made of a metal such as brass, it is superior in durability to a washer made of Teflon or the like, so that it can maintain airtightness even after the air tool has been used for a prolonged time.

What is claimed is:

1. A throttle valve disposed in a handle of an air tool, comprising:
   a throttle trigger provided on the handle of the air tool;
   a throttle pin fixed to said throttle trigger and adapted to axially move when said throttle trigger is operated;
   a valve stem coupled with said throttle pin and provided with a head portion, said head portion of said valve stem tilting in response to axial movement of said throttle pin;
   a valve bush press-fit into a shoulder portion provided inside the handle, said valve bush including a finished end surface facing said head portion of said valve stem; and
   a spring for urging said head portion of said valve stem to contact said finished end surface of said valve bush for providing a seal thereagainst and for allowing said valve stem to tilt when said throttle pin axially moves to release said seal.

2. A throttle valve according to claim 1, wherein said valve bush is provided with a groove, and an O-ring is fit into said groove.

3. A throttle valve according to claim 2, wherein an inner cylindrical surface of said valve bush is provided with a tapered surface having a diameter which increases toward an air exit.

4. A throttle valve according to claim 1, wherein an inner cylindrical surface of said valve bush is provided with a tapered surface having diameter which increases toward an air exit.

5. A throttle valve for use in an air tool, the air tool including a handle portion in which a bore for passage of air therethrough is defined, said throttle valve including:
   a valve bush including an air passage defined therethrough, said valve bush being fixedly receivable within the bore disposed with said air passage in communication with said bore, an air inlet end of said valve bush having a finished surface;
   a valve member receivable in and movable within said bore, said valve member including a surface disposed to permit contact engagement with said finished surface of said valve bush when urged towards said valve bush for substantially restricting a flow of air through the bore and said air passage;
   means for biasing said valve member against said valve bush; and
   user-operable means for urging said valve stem against said biasing to selectively permit a flow of air through the bore and said air passage.

6. A throttle valve according to claim 5, wherein said valve bush is comprised of a metal.

7. A throttle valve according to claim 5, wherein:
   said valve member comprises a valve stem including a head portion, said surface disposed to permit contact engagement with said finished surface of said valve bush being formed on said head portion; and
   said user-operable means for urging said valve stem against said biasing including a throttle trigger provided on the handle portion of the air tool, means for axially moving said throttle pin when said throttle trigger is operated, and a coupling of said valve stem with said throttle pin.

8. A throttle valve according to claim 5, wherein:
   said coupling of valve member is a valve stem including a head portion, and said head portion tilting in response to axial movement of said throttle pin.

9. A throttle valve according to claim 8, wherein an inner cylindrical surface of said air passage is provided with a tapered surface having a diameter which increases toward an air exit.

10. A throttle valve according to claim 5, wherein said valve bush is provided with a circumferential groove, and an O-ring is fit into said groove to seal against an inner wall of said bore.

* * * * *